United States Patent
Zhou et al.

(10) Patent No.: US 12,522,094 B2
(45) Date of Patent: Jan. 13, 2026

(54) CHARGING STATION WITH MARKER, CHARGING STATION SYSTEM, METHOD AND APPARATUS FOR RETURNING TO STATION AND LAWNMOWING ROBOT WITH IMAGE COLLECTION APPARATUS

(71) Applicant: Willand (Beijing) Technology Co., LTD., Beijing (CN)

(72) Inventors: Kai Zhou, Beijing (CN); Xu Yan, Beijing (CN); Wanyang Qiao, Beijing (CN); Tianning Yu, Beijing (CN)

(73) Assignee: Willand (Beijing) Technology Co., Ltd. (CN)

( * ) Notice: Subject to any disclaimer, the term of this patent is extended or adjusted under 35 U.S.C. 154(b) by 260 days.

(21) Appl. No.: 18/180,573

(22) Filed: Mar. 8, 2023

(65) Prior Publication Data
US 2023/0286399 A1    Sep. 14, 2023

(30) Foreign Application Priority Data

Mar. 9, 2022  (CN) .................. 202210234711.X
Mar. 2, 2023  (CN) .................. 202310202289.4
Mar. 2, 2023  (CN) .................. 202320416766.2

(51) Int. Cl.
*B60L 53/36*  (2019.01)
*A01D 34/00*  (2006.01)
(Continued)

(52) U.S. Cl.
CPC ............ *B60L 53/36* (2019.02); *A01D 34/008* (2013.01); *G05D 1/0246* (2013.01); *A01D 2101/00* (2013.01); *B60L 2200/40* (2013.01)

(58) Field of Classification Search
CPC ............................ B60L 53/36; A01D 34/008
See application file for complete search history.

(56) References Cited

U.S. PATENT DOCUMENTS

| 3,910,533 A | * | 10/1975 | Cheatham | ............ | B64G 1/6462 |
| | | | | | 244/172.4 |
| 2004/0012362 A1 | * | 1/2004 | Tsurumi | ............... | G05D 1/0234 |
| | | | | | 318/568.12 |

(Continued)

FOREIGN PATENT DOCUMENTS

| CN | 2243483 Y | 12/1996 |
| CN | 2243702 Y | 12/1996 |

(Continued)

OTHER PUBLICATIONS

Extended European search report of EP24178231.7 issued by EPO on Jul. 29, 2024.

*Primary Examiner* — Jess Whittington
(74) *Attorney, Agent, or Firm* — Emerson, Thomson & Bennett, LLC; Roger D. Emerson; Peter R. Detorre

(57) ABSTRACT

A charging station, a charging station system, a method and apparatus for returning to a charging station and a lawn mowing robot are provided. Feature markers are provided on the charging station, and the lawn mower can acquire pose information of the feature markers through its own image identification, so that relative pose information between the charging station and the lawn mower may be determined for path planning, enabling the lawn mower to realize station-returning and charging. The cost is low, and the structure is simple and easy to install and dismantle, since only the feature markers need to be provided on the charging station.

17 Claims, 7 Drawing Sheets

(51) Int. Cl.
   *G05D 1/00*   (2006.01)
   *A01D 101/00*   (2006.01)

(56) References Cited

U.S. PATENT DOCUMENTS

| | | | |
|---|---|---|---|
| 2004/0149860 A1* | 8/2004 | LeCroy, Jr. | G01S 17/48 244/158.1 |
| 2012/0265391 A1* | 10/2012 | Letsky | G05D 1/0221 701/25 |
| 2012/0323365 A1* | 12/2012 | Taylor | G05D 1/0225 901/1 |
| 2014/0100693 A1* | 4/2014 | Fong | G05D 1/0274 700/253 |
| 2016/0091899 A1* | 3/2016 | Aldred | B25J 5/00 901/1 |
| 2018/0237161 A1* | 8/2018 | Minnick | B64U 50/37 |
| 2019/0092183 A1* | 3/2019 | Sussman | B60L 53/65 |
| 2022/0047138 A1* | 2/2022 | Wong | G05D 1/0244 |
| 2023/0255426 A1* | 8/2023 | Choi | A47L 9/2805 15/301 |

FOREIGN PATENT DOCUMENTS

| | | |
|---|---|---|
| CN | 101604037 A | 12/2009 |
| CN | 209086465 U | 7/2010 |
| CN | 201622359 U | 11/2010 |
| CN | 104252180 A | 12/2014 |
| CN | 104252180 B | 5/2017 |
| CN | 109623816 A | 4/2019 |
| CN | 111596694 A | 8/2020 |
| CN | 111596694 B | 11/2020 |
| CN | 112327940 A | 2/2021 |
| CN | 212675214 U | 3/2021 |
| CN | 214154074 U | 9/2021 |
| CN | 114610035 A | 6/2022 |
| CN | 115316900 A | 11/2022 |
| CN | 116331025 A | 6/2023 |
| CN | 220465262 U | 2/2024 |
| GB | 2513912 A | 11/2014 |
| JP | 2012245842 A | 12/2012 |
| WO | WO2021253830 A1 | 12/2021 |

\* cited by examiner

CHARGING STATION WITH MARKER, CHARGING STATION SYSTEM, METHOD AND APPARATUS FOR RETURNING TO STATION AND LAWNMOWING ROBOT WITH IMAGE COLLECTION APPARATUS

CROSS-REFERENCE

The present application claims the priorities of Chinese patent application 202310202289.4, filed on Mar. 2, 2023, and entitled "CHARGING STATION, CHARGING STATIONSYSTEM, METHOD AND APPARATUS FOR RETURNING TO STATION AND LAWNMOWING ROBOT" and Chinese patent application 202320416766.2, filed on Mar. 2, 2023, and entitled "CHARGING STATION and CHARGING STATION SYSTEM", which claims the priority of Chinese patent application 202210234711.X, filed on Mar. 9, 2022, and entitled "Pile return method, device and mowing robot", the complete disclosure of which are expressly incorporated by reference herein.

TECHNICAL FIELD

Embodiments of the present disclosure relate to the technical field of gardening equipment, in particular to a charging station, a charging station system, a method and apparatus for returning to a charging station and a lawnmowing robot.

BACKGROUND

Lawnmowing robots can automatically mow lawns, etc., thereby reducing labor time consumption. Lawnmowing robots may follow input instructions to accomplish the act of returning to a charging station unattended, thus reducing the burden on users and saving time.

Most of the existing lawnmowing robot station-returning technologies are based on methods such as GPS positioning, guiding wire guidance, or virtual boundary patrol. For example, in an indoor use scenario, lawnmowing robots usually return to the station using infrared, ultrasonic induction station-returning technology or a virtual boundary guidance method based on map building. This infrared, ultrasonic station-returning has a great chance of false touch, and is seriously affected by environmental noise.

In an outdoor use scenario, most of the lawnmowing robots accomplish accurate return to the station based on GPS positioning and electromagnetic guiding wires in front of the station to assist in guiding. This GPS-positioning-based station-returning not only has high requirements for signal strength and signal accuracy, but also requires the arrangement of assisting electromagnetic guiding wires in a base plate of the charging station, which also has certain material cost and transportation cost.

In summary, automatic station-returning for the existing lawnmowing robots is costly, difficult and less stable.

SUMMARY

In order to solve the above problems, embodiments of the present disclosure provide a charging station, a charging station system, a method and apparatus for returning to a charging station and a lawnmowing robot, to at least partially solve the above problems.

One or more embodiments of the present disclosure provide a charging station, the charging station is provided with a plurality of feature markers, a distribution surface of at least two of the plurality of feature markers is different from a distribution surface of the remaining feature markers, and the feature markers are used for image identification by a lawnmowing robot to enable the lawnmowing robot to dock with the charging station for charging.

According to another aspect of the present disclosure, a charging station is provided, the charging station is provided with a marking component, the marking component includes a first marking component and a second marking component, and the first marking component and the second marking component have different distribution surfaces on the charging station.

According to another aspect of the present disclosure, a charging station system is provided, including the charging station according to any one of the above aspects and a marking apparatus, the marking apparatus is provided with a fourth marking component, and the fourth marking component is used to assist in determining a position of the charging station.

According to another aspect of the present disclosure, a method for returning to a charging station is provided, the method being used for directing a lawnmowing robot to return to a charging station, the lawnmowing robot being configured with an image collection apparatus, the charging station being distributed with feature markers, and the method including: acquiring available image frames collected by the image collection apparatus of the lawnmowing robot in a front area of the charging station, the number of feature markers identified in the image frames being greater than or equal to N, and the N being a positive integer greater than or equal to 3; determining a relative pose of the lawnmowing robot relative to the charging station, based on two-dimensional coordinates of the identified feature markers in the image frames, three-dimensional coordinates of the feature markers in a global coordinate system, and imaging parameters of the image collection apparatus; and driving the lawnmowing robot to return to the charging station based on the relative pose.

According to another aspect of the present disclosure, an apparatus for returning to a charging station is provided, the apparatus being configured to direct a lawnmowing robot to return to a charging station, the lawnmowing robot being configured with an image collection apparatus, the charging station being distributed with feature markers, and the apparatus including: an acquisition module, configured to acquire available image frames collected by the image collection apparatus of the lawnmowing robot in a front area of the charging station, the number of feature markers identified in the image frames being greater than or equal to N, and the N being a positive integer greater than or equal to 3; a determination module, configured to determine a relative pose of the lawnmowing robot relative to the charging station, based on two-dimensional coordinates of the identified feature markers in the image frames, three-dimensional coordinates of the feature markers in a global coordinate system, and imaging parameters of the image collection apparatus; and a driving module, configured to drive the lawnmowing robot to return to the charging station based on the relative pose.

According to another aspect of the present disclosure, a lawnmowing robot is provided, the lawnmowing robot being configured with an image collection apparatus, the lawnmowing robot including a controller, and the controller being configured to perform the method described above.

According to another aspect of the present disclosure, a computer storage medium is provided, where the computer storage medium stores a computer program, and the computer program, when executed by a processor, implements the method described above.

Using the available image frames collected by the image collection apparatus in the front area of the charging station to identify the two-dimensional coordinates of the feature markers, then combining the three-dimensional coordinates of the feature markers in the global coordinate system and the imaging parameters of the image collection apparatus, the method may accurately determine the relative pose between the lawnmowing robot and the charging station, and then direct the lawnmowing robot to return to the station accurately based on the relative pose. In this way, the use of the feature markers for positioning ensures positioning accuracy, and visual imaging may not be interfered by noise from other electromagnetic waves and signals in an environment, ensuring accuracy and reliability, there is no need to lay additional guiding wires, at the same time, the method overcomes the defect of GPS positioning error and fully ensures the accuracy of station-returning.

In addition, in the embodiments of the present disclosure, by simply providing the marking component on the charging station, the lawn mower can acquire pose information of the feature markers distributed in the marking component through its own image identification, so that relative pose information between the charging station and the lawn mower may be determined for path planning, enabling the lawn mower to realize station-returning and charging. The cost is low and the structure is simple and easy to install and dismantle, since only the feature markers need to be provided on the charging station.

BRIEF DESCRIPTION OF THE DRAWINGS

The following accompanying drawings are intended only for schematic illustration and interpretation of the present disclosure, and do not limit the scope of the present disclosure.

Figure 1A:
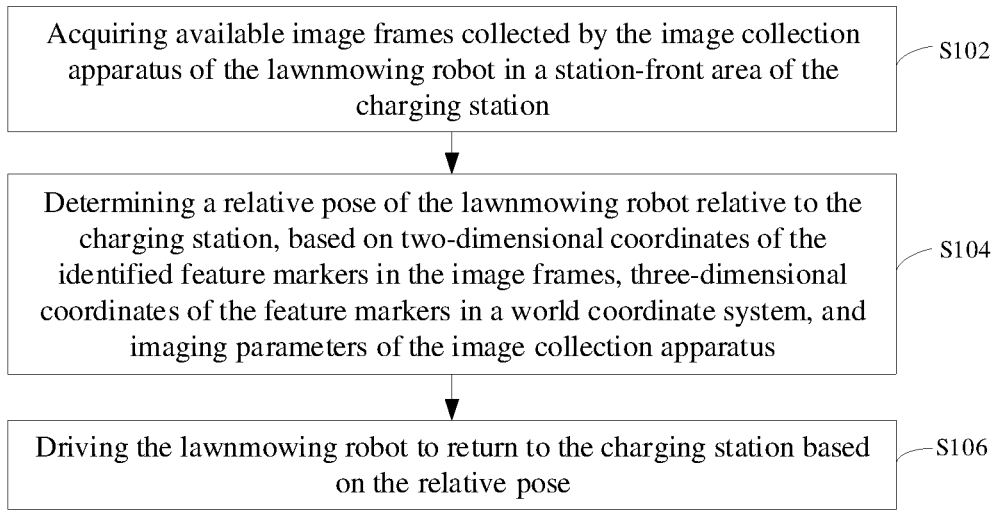
FIG. 1A is a schematic flowchart of steps of a method for returning to a charging station in Embodiment 1 of the present disclosure.

DESCRIPTION OF MARKERS OF ACCOMPANYING DRAWINGS 10, charging station; 11, charging station body; 111 mounting slot; 12, top cover; 13, base plate; 2, marking component; 20, feature marker; 211, first marking component; 212, second marking component; 213, third marking component; 214, fourth marking component; 22, reflective member; 221, light-transmitting portion; 222, reflective portion; 23, mounting plate; 3, charging structure; 41, first distribution surface; 42, second distribution surface; 43, third distribution surface; 44, fourth distribution surface; 50, marking apparatus; 60, lawn mowing robot; 61, imaging collection apparatus; 62, controller.

DETAILED DESCRIPTION OF EMBODIMENTS

In order to enable those of ordinary skills in the art to better understand the solution of the present disclosure, the technical solution in embodiments of the present disclosure will be clearly and thoroughly described below in conjunction with the accompanying drawings in the embodiments of the present disclosure. Obviously, the described embodiments are a part of the embodiments of the present disclosure, and not all of them. Based on the embodiments in the present disclosure, all other embodiments obtained by those of ordinary skills in the art without making creative work shall fall within the scope of protection of the present disclosure.

For the purpose of description and understanding, a structure and work scenario of a lawnmowing robot are briefly described as follows before describing a method for returning to a charging station.

In this embodiment, the lawnmowing robot may be an automatic lawn mower, which includes several major parts such as a main body, an image collection apparatus (which may also be called a vision collection apparatus), a navigation position estimation apparatus, a vision position estimation apparatus, and an autonomous moving apparatus.

The main body includes a housing and a lawnmowing blade assembly, etc. The lawnmowing blade assembly is configured to mow grass in the lawn so that the grass is at an appropriate height. The autonomous moving apparatus includes a drive wheel, a drive motor and a motor controller, etc. The motor controller is connected to the drive motor to control rotation of the drive motor and then drive the drive wheel to move, so as to realize moving forward, backward, steering, etc. of the lawnmowing robot.

The image collection apparatus may include a video camera, a camera, and so on. Imaging parameters of the image collection apparatus may be different for different structures, for example, the imaging parameters include aperture, focal length, optical axis, and so on.

The navigation position estimation apparatus is configured to position the lawnmowing robot, and then drive the lawnmowing robot to move based on a positioning result.

The vision position estimation apparatus may be configured to process image frames collected by the image collection apparatus, then estimate a relative pose of the lawnmowing robot relative to the charging station based on the image frames, so as to navigate the lawnmowing robot and drive it to move based on the relative pose. It should be noted that the vision position estimation apparatus may be a stand-alone chip having computing power or a common chip shared with other apparatuses, which is not limited in this regard.

Figure 1B:
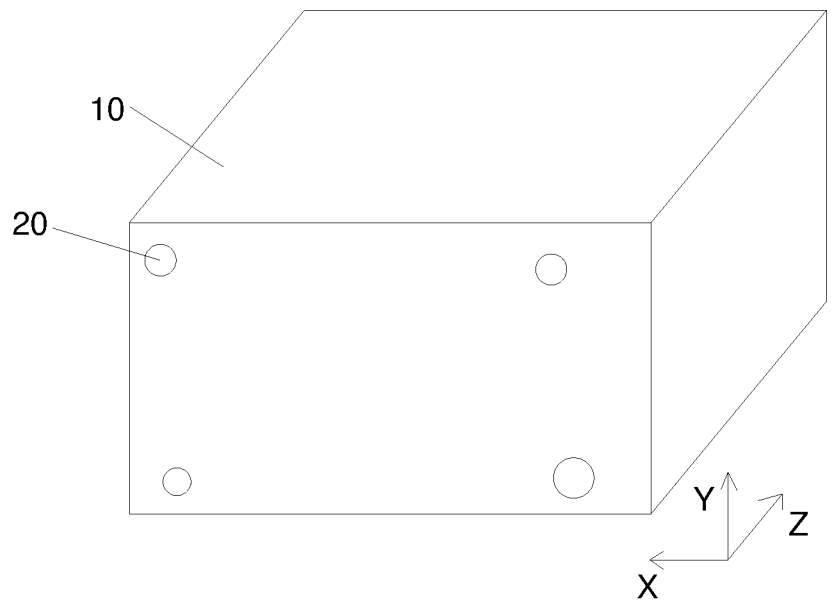
FIG. 1B is a schematic diagram of a distribution of feature markers in Embodiment 1 of the present disclosure.
Figure 1C:
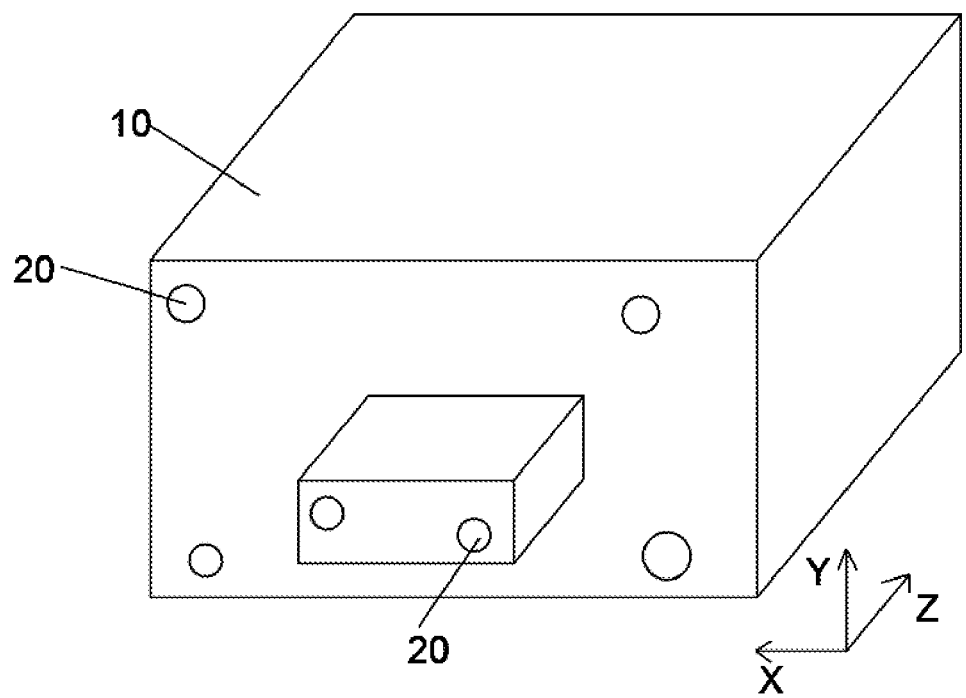
FIG. 1C is a schematic diagram of another distribution of feature markers in Embodiment 1 of the present disclosure.

As shown in FIG. 1B and FIG. 1C, a charging station (marking number 10 in FIG. 1B) is provided with Q feature markers (marking number 20 in FIG. 1B), the Q is greater than or equal to 2 and is a positive integer. The feature markers may be any appropriate pattern, shape or structure, etc., capable of marking, which is not limited in this regard. For example, the feature markers may be triangular bumps, or dots, rectangular patterns, two-dimensional codes or line segments, arcs, etc. provided on the charging station, further examples will be omitted herein.

Preferably, in order to improve the accuracy of relative pose positioning, for each coordinate axis of the global coordinate system, the maximum distance of projection of the Q feature markers on each of the coordinate axis is greater than or equal to a distance threshold (the distance threshold may be determined based on a required positioning identification accuracy). This makes the feature markers on the same distribution surface more dispersed on the distribution surface where they are located, and a distance between the feature markers is greater, thus helping to improve a detection efficiency and accuracy during relative pose positioning. The reason is that, in a coordinate system as shown in FIG. 1B, a Z-axis is a forward direction of the lawnmowing robot, and in a conventional flat ground environment, docking the lawnmowing robot in a charging station depends more on transformation of a yaw angle (i.e., an angle of rotation around a Y-axis), i.e., the greater a lateral distance between the feature markers on the charging station, when the relative pose of the lawnmowing robot relative to the charging station is changed, the greater an absolute distance of position change of the feature markers distributed on an imaging plane, so that an anti-interference ability is stronger. A pitch angle (i.e., an angle of rotation around an X-axis) is the same.

Preferably, as shown in FIG. 1C, a distribution surface of at least two of the feature markers in the Q feature markers is different from a distribution surface of the remaining feature markers, i.e., the plurality of feature markers provided on the charging station are on at least two different distribution surfaces, so that differentiation of the feature markers in a Z-axis direction is realized, and it may be determined after comparative experiments that: a charging station A, where all feature markers are located on the same distribution surface, is less resistant to noise than a charging station B, where at least two feature markers and the remaining feature markers are located on different distribution surfaces. For the same number of tests, the charging station A is unable to calculate the relative pose and an accuracy of the calculated relative pose is worse than that of the charging station B.

By optimizing the distribution of the feature markers distributed on the charging station, the anti-interference ability and an anti-sensitivity ability of the lawnmowing robot for relative pose identification may be improved.

However, it should be noted that the distribution method exemplified in this embodiment of the present disclosure is a preferred method, in other embodiments, the feature markers may use other distribution methods, as long as the relative pose can be calculated.

Embodiment 1

An implementation process of the method for returning to a charging station is described below as follows:

As shown in FIG. 1A, illustrating a flowchart of steps of a method for returning to a charging station. In this embodiment, the method includes the following steps:

Step S102: acquiring available image frames collected by the image collection apparatus of the lawnmowing robot in a front area of the charging station.

In this embodiment, the image collection apparatus collects the image frames of the environment during movement of the lawnmowing robot, and a plurality of image frames at different moments form a sequence of image frames (which may also be called a video). Since the pose of the lawnmowing robot is different at different moments, contents contained in the image frames may be different, some image frames may contain feature markers, and some image frames may not contain feature markers.

The available image frames may be image frames that are collected in the front area of the charging station and contain a sufficient number of feature markers, these image frames can solve the relative pose of the lawnmowing robot and may therefore be considered as the available image frames. Here, containing a sufficient number of feature markers may be considered as: the number of feature markers identified in the image frames is greater than or equal to N, and the N is a positive integer greater than or equal to 3.

Figure 1D:
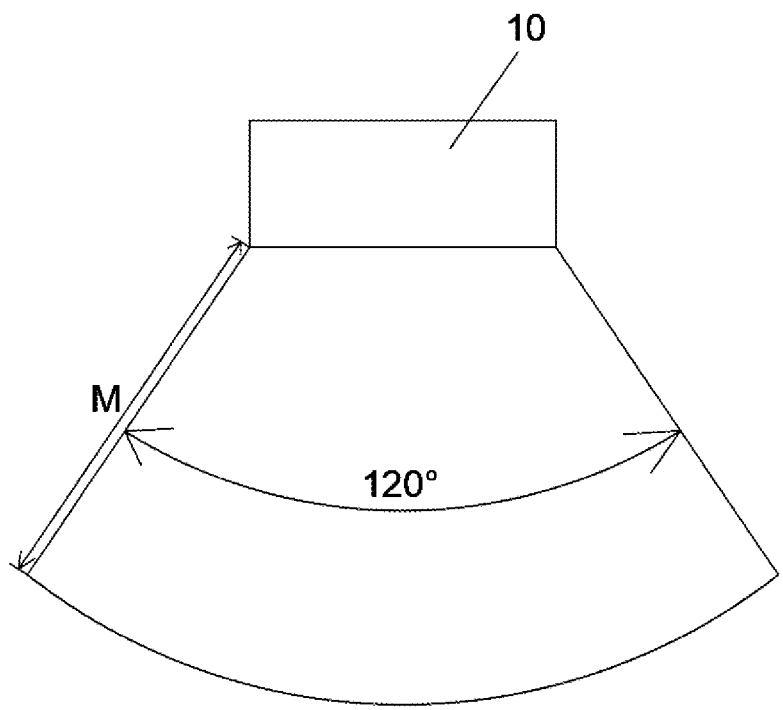
FIG. 1D is a schematic diagram of a front area in Embodiment 1 of the present disclosure.

As shown in FIG. 1D, the front area of the charging station includes a sector area corresponding to the charging station, the sector area is located in front of the charging station, and a radius of the sector area takes a value greater than 0 and less than M, and the M is a positive integer. The value of the M may be determined based on the imaging parameters of the image collection apparatus, sizes of the feature markers, etc., which is not limited in this regard.

In an example, the front area of the charging station may be a sector area with a radius of 2 meters and an angle of 120°. Of course, in other examples, a shape, a dimension, etc. of the front area of the charging station may be appropriately selected, which is not limited in this regard.

Figure 1E:
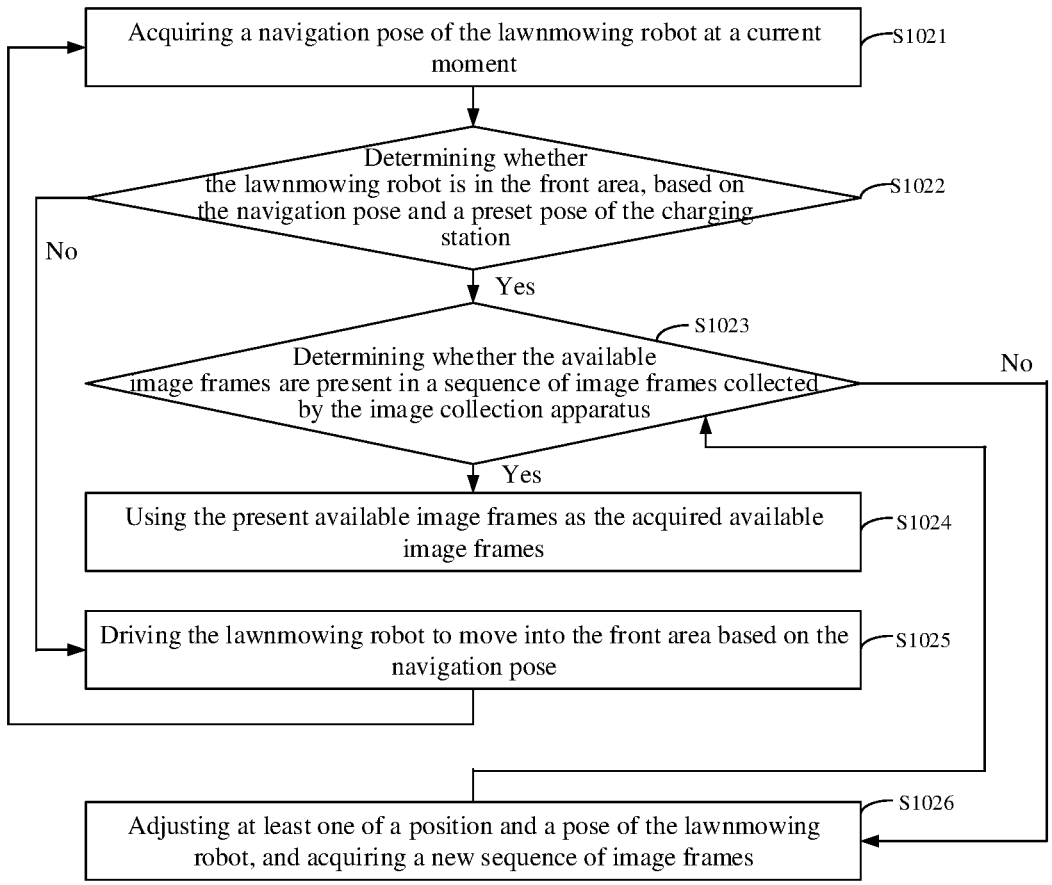
FIG. 1E is a schematic flowchart of sub-steps of step S102 in Embodiment 1 of the present disclosure.

Alternatively, in this embodiment, in order to ensure that the lawnmowing robot can reliably and accurately move to the charging station in any position, as shown in FIG. 1E, step S102 may be implemented through the following sub-steps:

Sub-step S1021: acquiring a navigation pose of the lawnmowing robot at a current moment.

For example, in a scenario, in normal work mode, when the lawnmowing robot receives a station-returning instruction, the navigation estimation apparatus of the lawnmowing robot may locate the navigation pose of the lawnmowing robot.

Sub-step S1022: determining whether the lawnmowing robot is in the front area of the charging station, based on the navigation pose and a preset pose of the charging station.

Based on the pose of the charging station, the front area of the charging station may be determined, then based on position information in the navigation pose, it may be determined whether the lawnmowing robot is in the front area of the charging station.

If the lawnmowing robot is in the front area of the charging station, it indicates that a distance between the charging station and the lawnmowing robot is sufficient to collect clear and appropriately sized feature markers, and sub-step S1023 may be performed; otherwise, the lawnmowing robot needs to be driven to move into the front area of the charging station first, so sub-step S1025 may be performed.

Sub-step S1023: determining whether the available image frames are present in the a sequence of image frames collected by the image collection apparatus, if the lawnmowing robot is in the front area of the charging station.

In a feasible method, image identification is performed on each image frame in the a sequence of image frames using a trained robot learning model to identify feature markers therefrom, and determine whether the image frames are the available image frames based on the number of feature markers identified.

Using N equal to 3 as an example, if the number of feature markers identified is greater than or equal to 3, the image frames are the available image frames. Sub-step S1024 may be performed; otherwise, sub-step S1026 may be performed.

Sub-step S1024: using the present available image frames as the acquired available image frames, if there are available image frames.

Step S104 may be performed after obtaining the available image frames.

Sub-step S1025: driving the lawnmowing robot to move into the front area of the charging station based on the navigation pose, if the lawnmowing robot is not in the front area of the charging station, and returning to the step of acquiring a navigation pose of the lawnmowing robot at a current moment to continue execution.

Based on the navigation pose obtained by the navigation position estimation apparatus, if it is determined that the lawnmowing robot is not in the front area of the charging station, the navigation position estimation apparatus may direct the lawnmowing robot to move based on the navigation pose, then return to sub-step S1021 for execution, and so on until the lawnmowing robot moves into the front area of the charging station. In this way, the lawnmowing robot enters a station-returning mode when moved into the front area of the charging station and a sufficient number of feature markers can be collected.

Sub-step S1026: adjusting at least one of a position and a pose of the lawnmowing robot, and acquiring a new a sequence of image frames, if the available image frames are not present, and returning to the step of determining whether the available image frames are present in the a sequence of image frames collected by the image collection apparatus to continue execution.

For example, in adjusting at least one of the position and the pose of the lawnmowing robot, the lawnmowing robot is adjusted to a new navigation pose, and the lawnmowing robot is outside the front area of the charging station when in the new navigation pose; the lawnmowing robot is driven into the front area of the charging station based on the new navigation pose, and the image collection apparatus collects a plurality of image frames during movement of the lawnmowing robot to form the a sequence of image frames.

For example, in the case where the lawnmowing robot enters into the front area of the charging station but there is no available image frame, the lawnmowing robot may be driven to exit the front area of the charging station, then enter the front area of the charging station again at a different angle, then collect image frames, and return to determine whether the available image frames are present in the a sequence of image frames collected by the image collection apparatus.

For example, when the lawnmowing robot is in the front area of the charging station for 5 s and does not detect a sufficient number of feature markers on the charging station, the lawnmowing robot may randomly select a direction to drive out of the front area of the charging station, drive in again at a different angle, detect feature markers on the charging station again, and so on until a sufficient number of feature markers are detected, then enter the station-returning mode.

Step S104 may be performed after obtaining the available image frames.

Step S104: determining a relative pose of the lawnmowing robot relative to the charging station, based on two-dimensional coordinates of the identified feature markers in the image frames, three-dimensional coordinates of the feature markers in a global coordinate system, and imaging parameters of the image collection apparatus.

In the station-returning mode, the vision position estimation apparatus of the robot continuously updates the relative pose of the lawnmowing robot and the charging station by detecting and matching the image frames, and then directs the lawnmowing robot to dock in the station to complete docking with the charging station.

Here, a method for detecting the image frames may be: identifying the image frames using a trained neural network model to detect feature markers in the image frames, and determining two-dimensional coordinates of the feature markers in the image frames.

Different neural network models may be trained for different feature markers to detect the feature markers in the image frames.

Based on the detected two-dimensional coordinates of the feature markers, the three-dimensional coordinates of the feature markers in the known global coordinate system, and the imaging parameters of the image collection apparatus, the relative pose at the current moment may be determined. A process for calculating the relative pose is, for example, as follows: based on the two-dimensional coordinates and the imaging parameters of the image collection apparatus, the two-dimensional coordinates may be converted into three-dimensional coordinates in a coordinate system of the image collection apparatus, and then a mapping relationship between the coordinate system of the image collection apparatus and the global coordinate system may be determined based on the three-dimensional coordinates of the feature markers in the coordinate system of the image collection apparatus and its three-dimensional coordinates in the global coordinate system, and the mapping relationship is the relative pose.

Step S106: driving the lawnmowing robot to return to the charging station based on the relative pose.

The pose of the lawnmowing robot may be adjusted based on the relative pose, so that the lawnmowing robot is facing towards the charging station, thereby realizing station-returning of the lawnmowing robot.

As can be seen from the foregoing process, the ability of the lawnmowing robot to quickly and accurately return to the station is greatly influenced by an accuracy of identifying the two-dimensional coordinates of the feature markers in the image frames, and since the image frames are collected during the movement of the lawnmowing robot, they are inevitably affected by motion blurring. In order to reduce an adverse effect of motion blurring on detection of the feature markers, and the accuracy of the two-dimensional coordinates, in this embodiment, when the image collection apparatus collects the image frames, exposure time of the image frames is positively correlated with a relative distance when a light intensity of an ambient light is fixed, and the relative distance is a distance between the lawnmowing robot and the charging station.

For example, in normal circumstances, the exposure time of the image collection apparatus is determined based on the light intensity of the ambient light, the brighter the ambient light the shorter the exposure time, and the shorter the exposure time, the less motion blurring is generated.

In an actual work process of the lawnmowing robot, if the feature markers in the image frames photographed when the distance of the lawnmowing robot from the charging station is greater than X meters (X is a positive integer and may be determined as needed) are missed in detection due to blurring, etc., the problem of miss detection may be solved by twisting the lawnmowing robot or approaching the charging station. Since the lawnmowing robot is far away from the charging station at this time, missed feature markers in the image frames or low accuracy of the matched two-dimensional coordinates have less impact on navigation accuracy and may be compensated by subsequent image frame adjustment.

When the distance between the lawnmowing robot and the charging station is less than or equal to Y (Y is a positive integer and less than X), due to the close distance between the two, if the feature markers are missed in detection due to motion blurring or the accuracy of the two-dimensional coordinates is insufficient, it may easily lead to too much deviation in the movement of the lawnmowing robot and the lawnmowing robot cannot return to the station accurately. In order to avoid this problem and at the same time ensure that a brightness of the photographed image frames meets detection requirements, at the same light intensity, the exposure time of the image collection apparatus decreases with the distance until the distance reaches a distance threshold, which may sufficiently reduce motion blurring.

For example, in an example, the exposure time remains constant when the light intensity and the distance are the same. When the light intensity remains constant but the distance decreases by z, the exposure time T decreases by a*z ms. Here, a may be set appropriately as needed. When the light intensity changes, the exposure time T increases or decreases accordingly. The effects of light intensity and distance on the exposure time are independent of each other.

In addition, based on study, affected by characteristics of the image collection apparatus, it was found that when the ambient light intensity is constant, the shorter the exposure time, the lower the restoration of the image frames to the scenario, and appropriate image frames look dark overall, but after experimental comparison, it was found that compared to the adverse effect of motion blurring on the accuracy of station-returning, the reduction in the restoration of the image frames has much less adverse effect on the accuracy of station-returning than motion blurring, so proper reduction of the exposure time at a close distance helps to improve the accuracy.

Alternatively, in order to further improve the accuracy, for image frames with lower restoration, data enhancement technology may be used to improve the accuracy of identifying feature markers, thus avoiding miss detection to improve robustness.

Using the available image frames collected by the image collection apparatus in the front area of the charging station to identify the two-dimensional coordinates of the feature markers, then combining the three-dimensional coordinates of the feature markers in the global coordinate system and the imaging parameters of the image collection apparatus, this embodiment may accurately determine the relative pose between the lawnmowing robot and the charging station, and then direct the lawnmowing robot to return to the station accurately based on the relative pose. In this way, the use of the feature markers for positioning ensures positioning accuracy, and visual imaging may not be interfered by noise from other electromagnetic waves and signals in an environment, ensuring accuracy and reliability, there is no need to lay additional guiding wires, at the same time, it overcomes the defect of GPS positioning error and fully ensures the accuracy of station-returning.

In this way, based on the image frames collected by the image collection apparatus, combined with the navigation position estimation apparatus with low accuracy requirements, the lawnmowing robot in any position in the work area may accurately return to the station and charge from any direction.

During approaching the station, stable station-docking and charging may be realized by using the characteristic that visual information such as image frames become more accurate with proximity. In particular, in this embodiment, feature marker distribution has better robustness and better resistance to detection sensitivity, and the problem of motion blurring, which is difficult to deal with in a vision solution, is also solved by adjusting the exposure time based on the distance.

Embodiment 2

Figure 2:
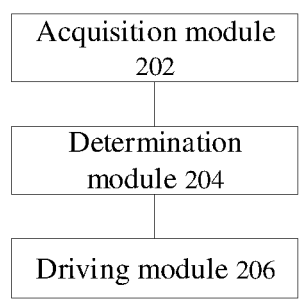
FIG. 2 is a structural block diagram of an apparatus for returning to a charging station provided in Embodiment 2 of the present disclosure.

Referring to FIG. 2, illustrating a structural block diagram of an apparatus for returning to a charging station provided in Embodiment 2.

The apparatus is configured to direct a lawnmowing robot to return to a charging station, the lawnmowing robot is configured with an image collection apparatus, the charging station is distributed with feature markers, and the apparatus includes:

an acquisition module 202, configured to acquire available image frames collected by the image collection apparatus of the lawnmowing robot in a front area of the charging station of the charging station, the number of feature markers identified in the image frames being greater than or equal to N, and the N being a positive integer greater than or equal to 3;

a determination module 204, configured to determine a relative pose of the lawnmowing robot relative to the charging station, based on two-dimensional coordinates of the identified feature markers in the image frames, three-dimensional coordinates of the feature markers in a global coordinate system, and imaging parameters of the image collection apparatus; and a driving module 206, configured to drive the lawnmowing robot to return to the charging station based on the relative pose.

Alternatively, the front area of the charging station includes a sector area corresponding to the charging station, the sector area is located in front of the charging station, and a radius of the sector area takes a value greater than 0 and less than M, and the M is a positive integer.

Alternatively, the acquisition module 202 is configured to acquire a navigation pose of the lawnmowing robot at a current moment; determine whether the lawnmowing robot is in the front area of the charging station, based on the navigation pose and a preset pose of the charging station; determine whether the available image frames are present in a sequence of image frames collected by the image collection apparatus, if the lawnmowing robot is in the front area of the charging station; and use the present available image frames as the acquired available image frames, if there are available image frames.

Alternatively, the acquisition module 202 is further configured to adjust at least one of a position and a pose of the lawnmowing robot, and acquire a new a sequence of image frames, if the available image frames are not present, and return to the step of determining whether the available image frames are present in the a sequence of image frames collected by the image collection apparatus to continue execution.

Alternatively, the acquisition module 202 is configured to adjust the lawnmowing robot to a new navigation pose, when adjusting at least one of a position and a pose of the lawnmowing robot, the lawnmowing robot being located outside the front area of the charging station when in the new navigation pose; and drive the lawnmowing robot into the front area of the charging station based on the new navigation pose, the image collection apparatus collecting a plurality of image frames during movement of the lawnmowing robot to form the a sequence of image frames.

Alternatively, the acquisition module 202 is further configured to drive the lawnmowing robot to move into the front area of the charging station based on the navigation pose, if the lawnmowing robot is not in the front area of the charging station, and return to the step of acquiring a navigation pose of the lawnmowing robot at a current moment to continue execution.

Alternatively, the charging station is provided with Q feature markers, the Q is greater than or equal to 2 and is a positive integer, for each coordinate axis of the global coordinate system, the maximum distance of projection of the Q feature markers on each of the coordinate axis is greater than or equal to a distance threshold.

Alternatively, a distribution surface of at least two of the feature markers in the Q feature markers is different from a distribution surface of the remaining feature markers.

Alternatively, when the image collection apparatus collects the image frames, exposure time of the image frames is positively correlated with a relative distance when a light intensity of an ambient light is fixed, and the relative distance is a distance between the lawnmowing robot and the charging station.

The apparatus is capable of achieving corresponding effects of the corresponding method, therefore detailed description thereof will be omitted.

Embodiment 3

Figure 8:
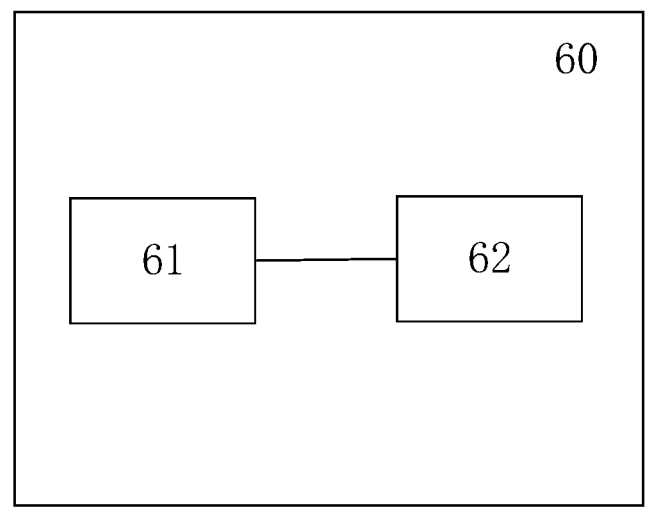
FIG. 8 is a schematic diagram of a lawn mowing robot according to an exemplary embodiment of the present disclosure.

According to an embodiment of the present disclosure, referring to FIG. 8, a lawnmowing robot 60 is provided, the lawnmowing robot is configured with an image collection apparatus 61, including a controller 62, and the controller 62 is configured to perform the foregoing method. The controller may implement the operations corresponding to the foregoing method and achieve corresponding effects, detailed description thereof will be omitted.

According to another aspect of the present disclosure, a computer storage medium is provided, where the computer storage medium stores a computer program therein, the computer program, when executed by a processor, implements the method described above. The program may implement the operations corresponding to the foregoing method and achieve corresponding effects, detailed description thereof will be omitted.

According to another aspect of the present disclosure, a charging station 10 is provided, the charging station 10 is provided with Q feature markers 20, a distribution surface of at least two of the feature markers 20 in the Q feature markers 20 is different from a distribution surface of the remaining feature markers 20, and the Q is greater than or equal to 2 and is a positive integer.

The charging station provided according to an embodiment, the charging station is provided with Q feature markers 20, the distribution surface of at least two of the feature markers 20 in the Q feature markers 20 is different from the distribution surface of the remaining feature markers 20, and the Q is greater than or equal to 2 and is a positive integer. In the embodiments of the present disclosure, by simply providing the feature markers 20 on the charging station, the lawnmowing robot can acquire pose information of the feature markers 20 through its own image identification, so that relative pose information between the charging station and the lawnmowing robot may be determined for path planning, enabling the lawnmowing robot to realize station-returning and charging. The cost is low and the structure is simple and easy to install and dismantle, since only the feature markers 20 need to be provided on the charging station. In addition, the distribution surface of at least two of the plurality of feature markers 20 being different from the distribution surface of the remaining feature markers 20, it can improve the accuracy of image identification by the lawnmowing robot to calculate the relative pose information of the charging station.

As shown in FIG. 1B and FIG. 1C, the charging station (marking number 10 in FIG. 1B) is provided with Q feature markers 20 (marking number 20 in FIG. 1B), the Q is greater than or equal to 2 and is a positive integer. The feature markers 20 may be any appropriate pattern, shape or structure, etc., capable of marking, which is not limited in this regard. For example, the feature markers 20 may be triangular bumps, or dots, rectangular patterns, two-dimensional codes or line segments, arcs, etc. provided on the charging station, further examples will be omitted herein.

Preferably, in order to improve the accuracy of relative pose positioning, for each coordinate axis of the global coordinate system, the maximum distance of projection of the Q feature markers 20 on each of the coordinate axis is greater than or equal to a distance threshold (the distance threshold may be determined based on a required positioning identification accuracy). This makes the feature markers 20 on the same distribution surface more dispersed on the distribution surface where they are located, and a distance between the feature markers 20 is greater, thus helping to improve a detection efficiency and accuracy during relative pose positioning. The reason is that, in a coordinate system as shown in FIG. 1B, a Z-axis is a forward direction of the lawnmowing robot, and in a conventional flat ground environment, docking the lawnmowing robot in a charging station depends more on transformation of a yaw angle (i.e., an angle of rotation around a Y-axis), i.e., the greater a lateral distance between the feature markers 20 on the charging station, when the relative pose of the lawnmowing robot relative to the charging station is changed, the greater an absolute distance of position change of the feature markers 20 distributed on an imaging plane, so that an anti-interference ability is stronger. A pitch angle (i.e., an angle of rotation around an X-axis) is the same.

Preferably, as shown in FIG. 1C, a distribution surface of at least two of the feature markers 20 in the Q feature markers 20 is different from a distribution surface of remaining feature markers 20 of the feature markers 20, i.e., the plurality of feature markers 20 provided on the charging station are on at least two different distribution surfaces, so that differentiation of the feature markers 20 in a Z-axis direction is realized, and it may be determined after comparative experiments that: a charging station A, where all feature markers 20 are located on the same distribution surface, is less resistant to noise than a charging station B, where at least two feature markers 20 and the remaining feature markers 20 are located on different distribution surfaces. For the same number of tests, the charging station A is unable to calculate the relative pose and an accuracy of the calculated relative pose is worse than that of the charging station B.

By optimizing the distribution of the feature markers 20 distributed on the charging station, the anti-interference ability and an anti-sensitivity ability of the lawnmowing robot for relative pose identification may be improved. However, it should be noted that the distribution method exemplified in this embodiment of the present disclosure is a preferred method, in other embodiments, the feature markers 20 may use other distribution methods, as long as the relative pose can be calculated.

According to another aspect of the present disclosure, a charging station 10 is provided, for the purpose of description and understanding, an overall structure of the charging station 10 is briefly described as follows before describing the charging station of this embodiment.

The charging station 10 may include a charging station main body 1 and a charging assembly 3. The charging station main body 1 includes a top cover 12, a charging station body 11 and a base plate 13, and the charging assembly 3 is mounted on a side of the charging station body 11, where the top cover 12 is connected to an upper end of the charging station body 11 and the base plate 13 is connected to a lower end of the charging station body 11.

Referring to FIG. 1A to FIG. 7, the charging station 10 in this embodiment has a plurality of feature markers 20 preset on the charging station 10, a distribution surface of at least two of the feature markers 20 in the plurality of feature markers 20 is different from a distribution surface of the remaining feature markers 20, and the feature markers 20 are used for image identification by a lawnmowing robot to enable the lawnmowing robot to dock with the charging station for charging.

Exemplarily, the feature markers 20 are marking points, and the marking points refer to points having abstract meaning, which may be explicit marking points, for example, end points of line segments, corner points of shapes, corner points of two-dimensional codes, etc., or implicit marking points for semantic classes, for example, a midpoint of intersection of different surfaces, semantic information of the marker itself such as the wrist of a human-shaped marker, a center point of the densest grass of a grass marker, etc. The marking points may be points on a surface, or may be convex points or concave points on that surface. The feature markers 20 in this embodiment refers to explicit marking points on the charging station 10, which may be marking points of the charging station 10 itself, such as end points of edges on the surface of the charging station 10, or marking points designed according to requirements of an image identification algorithm of the lawnmowing robot. For example, marking components 2 of different shapes are provided on the charging station 10, the feature markers 20 are the corner points of the shapes of the marking components 2, etc., which is not limited in this regard in this embodiment.

An image collection apparatus of the lawnmowing robot collects available image frames in the front area of the charging station of the charging station 10 and identifies the preset feature markers 20 on the surface of the charging station 10 from the image frames based on the preset identification algorithm, where the preset feature markers 20 are marking points on the charging station 10 preset based on the preset identification algorithm. Based on two-dimensional coordinates of the identified feature markers 20 in the image frames, three-dimensional coordinates of the feature markers 20 in a global coordinate system, and imaging parameters of the image collection apparatus, a relative pose of the lawnmowing robot relative to the charging station 10 is determined; and the lawnmowing robot is driven to return to the charging station 10 based on the relative pose.

Referring to FIG. 1C, the charging station 10 is provided with a plurality of feature markers 20, a distribution surface of at least two of the feature markers 20 in the plurality of feature markers 20 is different from a distribution surface of the remaining feature markers 20, i.e., the plurality of feature markers 20 provided on the charging station 10 are on at least two different distribution surfaces, so that differentiation of the feature markers 20 in a Z-axis direction is realized, and it may be determined after comparative experiments that: a charging station A, where all feature markers 20 are located on the same distribution surface, is less resistant to noise than a charging station B, where at least two feature markers 20 and the remaining feature markers 20 are located on different distribution surfaces. For the same number of tests, the charging station A is unable to calculate the relative pose and an accuracy of the calculated relative pose is worse than that of the charging station B.

In this embodiment, by simply providing the feature markers 20 on the charging station 10, the lawnmowing robot can acquire pose information of the feature markers 20 through its own image identification, so that relative pose information between the charging station 10 and the lawnmowing robot may be determined for path planning, enabling the lawnmowing robot to realize station-returning and charging. The cost is low and the structure is simple and easy to install and dismantle, since only the feature markers 20 need to be provided on the surface of the charging station. In addition, the distribution surface of at least two of the plurality of feature markers 20 being different from the distribution surface of the remaining feature markers 20, it can improve the accuracy of image identification by the lawnmowing robot to calculate the relative pose information of the charging station 10.

Referring to FIG. 3, in a specific implementation, a marking component 2 is provided on the surface of the charging station 10, the marking component 2 includes a first marking component 211 and a second marking component 212, and the first marking component 211 and the second marking component 212 have different distribution surfaces on the charging station 10. At least two feature markers 20 are distributed on the marking component 2.

Exemplarily, the number of the first marking component 211 and the second marking component 212 may be greater than or equal to 1 and is a positive integer, respectively. The marking component 2 may have different shapes, such as rectangular, triangular, circular or L-shaped. The first marking component 211 and the second marking component 212 may use the same shape of the marking components 2 or different shapes of the marking components 2. For example, the first marking component 211 may use 4 L-shaped marking components 2 and the second marking component 212 may use 1 strip-shaped marking component 2, which is not limited in this regard in this embodiment. Each marking component 2 may be of a single shape or a combination of a plurality different shapes. The marking component 2 may be flat, such as a sticker, or may be three-dimensional, such as a plastic reflective assembly.

The number of feature markers 20 on each marking component 2 may be greater than or equal to 2 and is a positive integer, and distribution locations of the feature markers 20 on different shapes of the marking components 2 are different, which may be preset based on the image identification algorithm of the lawnmowing robot, e.g., the feature markers 20 on a rectangular marking component 2 may be provided at least two of the four corner points, and the feature markers 20 on a L-shaped marking component 2 may be provided at least two of the four end points, etc.

In this specific implementation, through the marking component 2, the feature markers 20 have more optional distribution locations on the charging station 10, and the number of feature markers 20 can be provided is more, thereby improving the accuracy of image identification calculations by the lawnmowing robot; in addition, by providing the marking component 2, the location and number of feature distributions may be set based on the image identification algorithm or hardware specifications used by the lawnmowing robot, enabling adaptation to a wider range of robot products.

In a specific implementation, the first marking component 211 is located on a first distribution surface 41 of the charging station 10, the second marking component 212 is located on a second distribution surface 42 of the charging station 10, an angle is formed between a normal of the first distribution surface 41 and a normal of the second distribution surface 42, and the angle is not equal to 0 degree; or the normal of the first distribution surface 41 is parallel to the normal of the second distribution surface 42, and the first distribution surface 41 and the second distribution surface 42 are spaced apart in the direction of the normal. Exemplarily, referring to FIG. 3A and FIG. 3B, the first distribution surface 41 may be a first side of the charging station 10 provided with a charging structure 3, and the second distribution surface 42 may be a side on the charging station 10 that connects to the first side, or a side, an upper surface or a lower surface on the charging structure 3; the normal of the two (the dotted lines shown in the figure) form an angle A, and the angle A is not equal to 0 degree, then the first distribution surface 41 and the second distribution surface 42 are different distribution surfaces. Or, the first distribution surface 41 may be the first side of the charging station 10 provided with the charging structure 3, and the second distribution surface 42 may be a side opposite to the first side on the charging station 10 or a front-end surface of the charging structure 3. The normal of the two (the dotted lines shown in the figure) are parallel, but they are spaced apart in the normal direction. The first distribution surface 41 and the second distribution surface 42 are different distribution surfaces. In this specific implementation, by determining a positional relationship between the distribution surfaces corresponding to the first marking component 211 and the second marking component 212, it may be determined that the first marking component 211 and the second marking component 212 are located on different distribution surfaces.

In a specific implementation, the first distribution surface 41 and the second distribution surface 42 may include planes and curved surfaces. Exemplarily, the first distribution surface 41 and the second distribution surface 42 may be sides of the charging station 10, or edges where the two sides intersect, etc. It should be noted that when the marking component 2 is provided on a curved surface, the normal of the location of the marking component 2 is used as the normal of the distribution surface of the marking component 2. When a plurality of feature markers 20 on distribution surfaces with large differences in curvature are collected simultaneously, the final calculated relative pose information of the charging station 10 and the lawnmowing robot is more accurate.

In a specific implementation, the charging station 10 includes the charging station body 11 and the charging structure 3, the charging structure 3 is mounted on a first side of the charging station body 11, the second marking component 212 is provided on the charging structure 3, and the first marking component 211 is provided on the first side of the charging station body 11 where the charging structure 3 is mounted.

Exemplarily, one end of the charging structure 3 is mounted on the first side of the charging station body 11 and the other end of the charging structure 3 extends out of the charging station body 11, and the charging structure 3 is used to connect to a charging port of the lawnmowing robot to charge the lawnmowing robot. The second marking component 212 is provided on the charging structure 3, and the first marking component 211 is provided on the first side of the charging station body 11 where the charging structure 3 is mounted. For example, the first marking component 211 may use 4 L-shaped marking components 2 and the second marking component 212 may use 1 strip-shaped marking component 2. The strip-shaped marking component is mounted on one end of the charging structure 3 extending out of the charging station body 11, and the 4 L-shaped marking components are mounted on the first side of the charging station body 11 where the charging structure 3 is mounted. Depending on projection positions of the marking components 2 on the first side of the charging station body 11 where the charging structure 3 is mounted, the 4 L-shaped marking components 2 surround the strip-shaped marking component 2, which have both aesthetics and functionality of the feature markers 20.

In this specific implementation, by providing the second marking component 212 on the charging structure 3 and the first marking component 211 on the side of the charging station body 11 where the charging structure 3 is mounted, structural features of the charging station 10 itself are used, so that the first marking component 211 and the second marking component 212 are located on different distribution surfaces. There is no need to set up a separate protruding plane or curved surface, the structure is simple, and costs can be saved.

In a specific implementation, the charging station 10 includes the charging station body 11 and the charging structure 3, the charging structure 3 is mounted on a first side of the charging station body 11, the marking component 2 further includes a third marking component 213, the first marking component 211 is provided on the first side, and the third marking component 213 is provided on at least one of the other sides or edges of the charging station body 11 other than the first side.

Exemplarily, the first marking component 211 and the third marking component 213 may be respectively distributed on the first side of the charging station 10 and any side adjacent to the first side, or the first side and the side opposite the first side, or the first side and any edge (an edge is an intersection of two adjacent sides in a peripheral surface), or the first side, any edge and any side adjacent to the first side, or any side of the peripheral surface and an edge, etc. It should be noted that the edge here may refer to an edge surface, and the edge surface may be a plane or a curved surface.

It should be noted that in this implementation, the surface where the first marking component 211 is located is the aforementioned first distribution surface 41, and the surface where the third marking component 213 is located is the aforementioned second distribution surface 42, and an angle/included angle between the normal of the first distribution surface 41 of the first marking component 211 and a normal of the second distribution surface 42 of the third marking component 213 is formed, and the angle is not equal to 0 degree.

In this specific implementation, it may be ensured that the lawnmowing robot collects and identifies a greater number of feature markers 20 in all directions, which in turn produces more robust image identification algorithm effects. For example, the feature marker 20 is provided on any side adjacent to the first side, so that the lawnmowing robot can identify the feature markers 20 even when an offset angle between the lawnmowing robot and the first side is large, to further adjust the pose of the lawnmowing robot to realize station-returning and charging.

Figure 4:
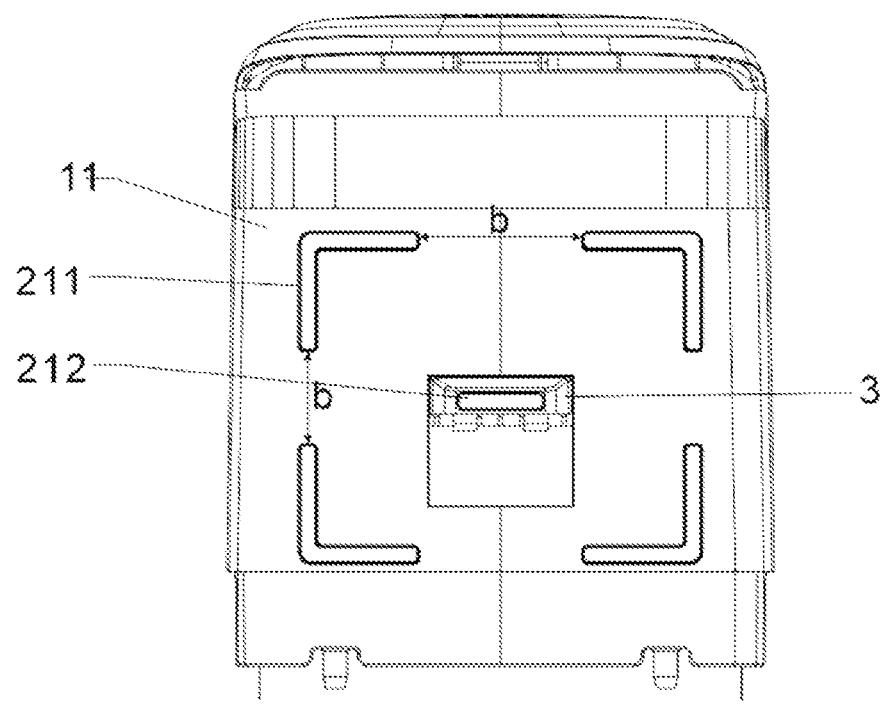
FIG. 4 is a schematic diagram of a distribution of marking components on a charging station of according to an exemplary embodiment of the present disclosure.

Referring to FIG. 4, in a specific implementation, the marking component 2 is projected on a surface of the charging station body 11 where the marking component 2 is located to form a marking patterns, the minimum inner diameter in the marking pattern is greater than or equal to a first preset threshold, and the first preset threshold is 3 cm. Exemplarily, the marking component 2 is projected on the side of the charging station body 11 where the marking component 2 is located to form the marking pattern, i.e., shape of the marking component 2, and the minimum inner diameter in the marking pattern is greater than or equal to the first preset threshold, i.e., it indicates that a width at any one place in the marking pattern is greater than or equal to the first preset threshold. For example, the width of a rectangle in a rectangular marking component 2 is the minimum inner diameter, the height of a triangle in a triangular marking component 2 is the minimum inner diameter, and the width of a L-shape in a L-shaped marking component 2 (width a in FIG. 4) is the minimum inner diameter. The first preset threshold may be determined based on a size of the work area and a size of a station-docking range of the lawnmowing robot, such that the lawnmowing robot can capture the charging station body 11 within the work area range, and the first preset threshold may be determined as 3 cm.

In this specific implementation, by setting the minimum inner diameter of the shape of the marking component 2 being greater than or equal to the first preset threshold, the size of the marking component 2 can be controlled to meet image identification requirements of the lawnmowing robot, so as to avoid the inability to accurately identify the feature markers 20 due to the size of the marking component 2 being too small, or the size of the marking component 2 is too large, resulting in increased costs, and affecting the aesthetics of the charging station 10.

In a specific implementation, a minimum spacing between the marking components 2 located on the same distribution surface on the charging station body 11 is greater than or equal to a second preset threshold, and the second preset threshold is 3 cm. Exemplarily, referring to FIG. 4, the minimum spacing between the marking components 2 on the same surface of the charging station body 11 may be indicated as b. The second preset threshold may be determined based on the size of the work area and the size of the station-docking range of the lawnmowing robot, such that the lawnmowing robot can capture the charging station body 11 within the work area range, and can capture the feature markers 20 within the station-docking range. For example, the second preset threshold is determined as 3 cm. In this specific implementation, by setting the minimum spacing between adjacent marking components 2 on the same distribution surface being greater than or equal to the second preset threshold, the spacing between the marking components 2 can be controlled to meet the image identification requirements of the lawnmowing robot, so as to improve the accuracy of image identification by the lawnmowing robot.

It should be noted that this specific implementation controls that the minimum spacing between adjacent marking components 2 on the same distribution surface is greater than or equal to the second preset threshold, rather than the maximum spacing, which may eliminate the impact of the size of the marking component 2 on the spacing between the adjacent marking components 2, and at the same time ensure that the size of the marking component 2 and the spacing between the adjacent marking components 2 both meet the image identification requirements of the lawnmowing robot.

In a specific implementation, the marking component 2 is a reflective assembly or a luminous assembly. A use environment of the lawnmowing robot and the charging station 10 is usually outdoor, and when the weather condition is poor or light is insufficient due to night, etc., the image collection apparatus of the lawnmowing robot cannot accurately collect the feature markers 20 on the charging station 10. In this specific implementation, by setting the marking component 2 as a reflective assembly or a luminous assembly, the feature markers 20 are more prominent and easier to be identified on the charging station 10, improving the accuracy of identification by the lawnmowing robot.

In a specific implementation, the reflective assembly includes a reflective member 22 and a mounting plate 23, the reflective member 22 includes a light-transmitting portion 221 and a reflective portion 222, the reflective portion 222 includes a plurality of tapered elements, and each side of the tapered elements is square, the reflective portion 222 of the reflective member 22 is fixedly connected to the mounting plate 23, and the reflective assembly is connected to a side of the charging station body 11.

Figure 5:
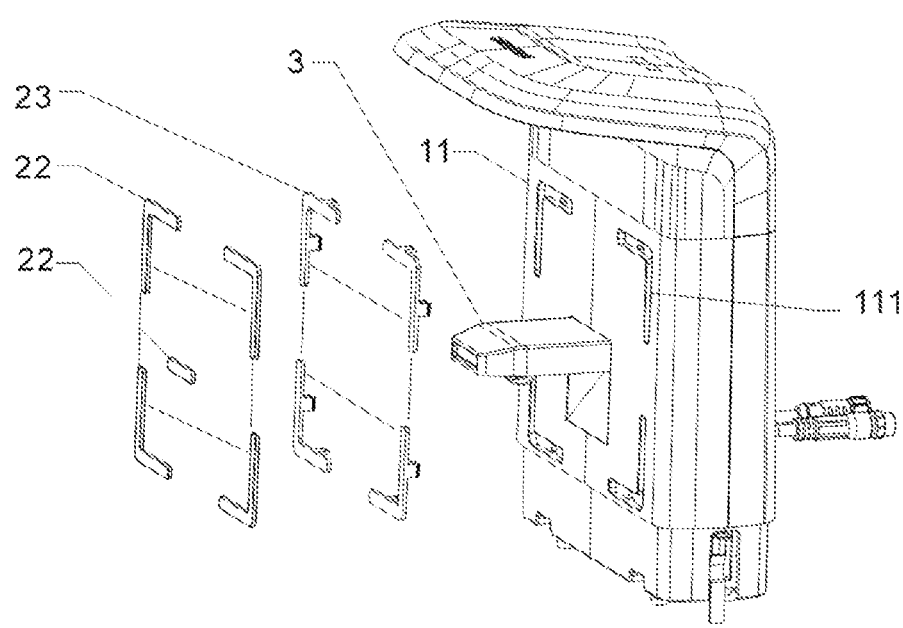
FIG. 5 is an exploded view of a marking component of a charging station according to an exemplary embodiment of the present disclosure.
Figure 6:
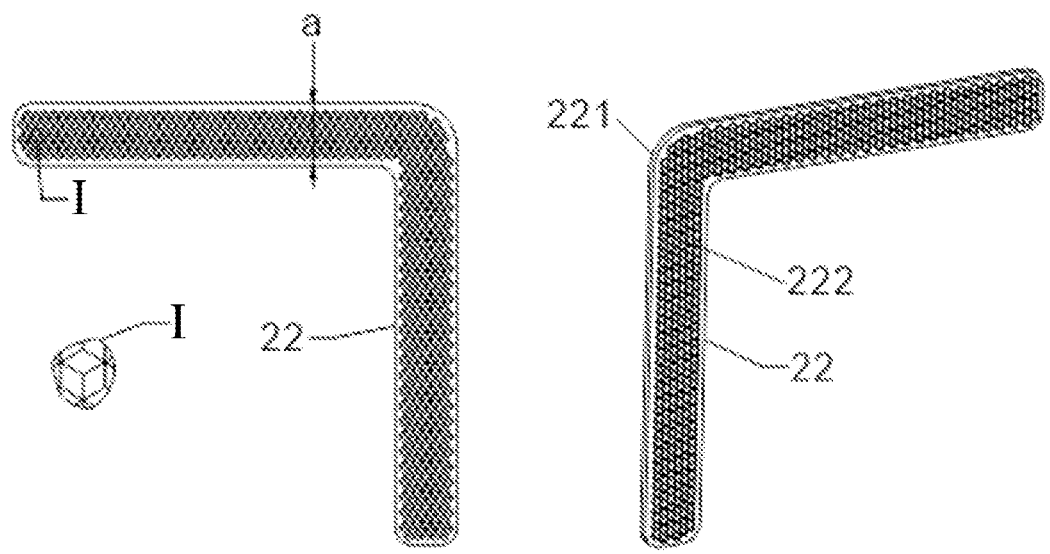
FIG. 6 is a schematic structural diagram of a reflective member of a marking component of a charging station according to an exemplary embodiment of the present disclosure.

Exemplarily, referring to FIG. 5 and FIG. 6, an enlarged view of a tapered element in the reflective portion 222 is shown in I in FIG. 6. The connection of the reflective assembly to the charging station body 11 may be ultrasonic welding, snap or paste, etc. The reflective portion 222 of the reflective member 22 is connected to the mounting plate 23 by ultrasonic welding. The reflective member 22 may be transparent plastic material, and the reflective member 22 may be molded in one piece by injection molding. The surface of the charging station body 11 is provided with a mounting slot 111, and when the reflective assembly is mounted in the mounting slot 111 of the charging station body 1, a side of the reflective member 22 backward facing the charging station body 11 is the light-transmitting portion 221, and the light-transmitting portion 221 may be a transparent glossy surface, through which light can be emitted into the reflective portion 222 for light reflection. A side of the reflective member 22 facing the charging station body 11 is the reflective portion 222. The reflective portion 222 may include a plurality of tapered elements. As shown in the magnified partial view I in FIG. 6, the surface of one tapered element may include three squares, the three squares are perpendicular to each other, and shared one common vertex. The plurality of tapered elements is evenly distributed in parallel. An edge length of the tapered element may be set in a range of 0.5 mm-1 mm, so that the tapered element is smaller in size and denser in arrangement. When illuminated, reflected light is more uniform, and it is not easy to produce glare. An outline of the marking component 2 is clearer and easier to be identified.

In this specific implementation, by setting the marking component 2 as a reflective assembly, the structure is simple and easy to install, and the marking component 2 is easier to be identified on the charging station body 11.

In a specific implementation, at least one of a color and a texture of the surface of the marking component 2 is different from that of the surface of the charging station body 11. Specifically, by setting at least one of the texture and the color of the surface of the marking component 2 to be different from the color and the texture of the surface of the charging station body 11, the image collection apparatus of the lawnmowing robot can capture the feature markers 20 on the charging station 10 more quickly and accurately. Preferably, the greater the difference between the texture and the color of the surface of the marking component 2 and the surface of the charging station 10, the easier the feature markers 20 may be identified.

According to another aspect of the present disclosure, a charging station 10 is provided, the charging station 10 is provided with a marking component 2, the marking component 2 is used to indicate a position of the charging station 10, so that a lawnmowing robot is capable of docking with the charging station 10 for charging.

Exemplarily, the marking component 2 may be 1 or a plurality. There may be at least one feature marker 20 distributed on the marking component 2, and the feature marker 20 may be a corner point of the shape of the marking component 2, etc. The marking component 2 may have different shapes, such as rectangular, triangular, or circular. The first marking component 211 and the second marking component 212 may use the same shape of the marking components 2 or different shapes of the marking components 2. For example, the first marking component 211 may use 4 L-shaped marking components 2 and the second marking component 212 may use 1 strip-shaped marking component 2, which is not limited in this regard in this embodiment. Each marking component 2 may be of a single shape or a combination of a plurality of different shapes. The marking component 2 may be flat, such as a sticker, or may be three-dimensional, such as plastic. The marking component 2 may be a reflective assembly or a luminous assembly, so that the feature marker 20 may be more prominent and easier to be identified on the charging station 10, when the weather condition is poor or light is insufficient due to night, etc., the image collection apparatus of the lawnmowing robot can still accurately collect the feature marker 20 on the charging station 10, improving the accuracy of identification by the lawnmowing robot.

The image collection apparatus of the lawnmowing robot collects available image frames in the front area of the charging station of the charging station 10 and identifies the preset feature markers 20 on the surface of the charging station 10 from the image frames based on the preset identification algorithm, where the preset feature markers 20 are marking points on the charging station 10 preset based on the preset identification algorithm. Based on two-dimensional coordinates of the identified feature markers 20 in the image frames, three-dimensional coordinates of the feature markers 20 in a global coordinate system, and imaging parameters of the image collection apparatus, a relative pose of the lawnmowing robot relative to the charging station 10 is determined; and the lawnmowing robot is driven to return to the charging station 10 based on the relative pose.

In this embodiment, by simply providing the feature markers 20 on the charging station 10, the lawnmowing robot can acquire pose information of the feature markers 20 distributed on the marking component 2 through its own image identification, so that relative pose information between the charging station 10 and the lawnmowing robot may be determined for path planning, enabling the lawnmowing robot to realize station-returning and charging. The cost is low and the structure is simple and easy to install and dismantle, since only the feature markers 20 need to be provided on the surface of the charging station.

In a specific implementation, the charging station 10 includes the charging structure 3, and the marking component 2 is provided on the charging structure 3. Exemplarily, the charging structure 3 is provided on a side of the charging station 10, and the marking component 2 is provided on the charging structure 3. The connection may be removable connecting, such as snap, paste, or may be ultrasonic welding, which is not limited in this regard in this embodiment.

In this specific implementation, the marking component 2 may be provided only on the charging structure 3, so it is not necessary to consider the location of the marking component 2 in dimensional design of the charging station body 11, which may reduce the size of the charging station body 11 and lower the cost; secondly, the design of the texture and the color of the charging station body 11 also does not need to consider the impact on the information of the marking component 2 collected by the lawnmowing robot.

Figure 3A:
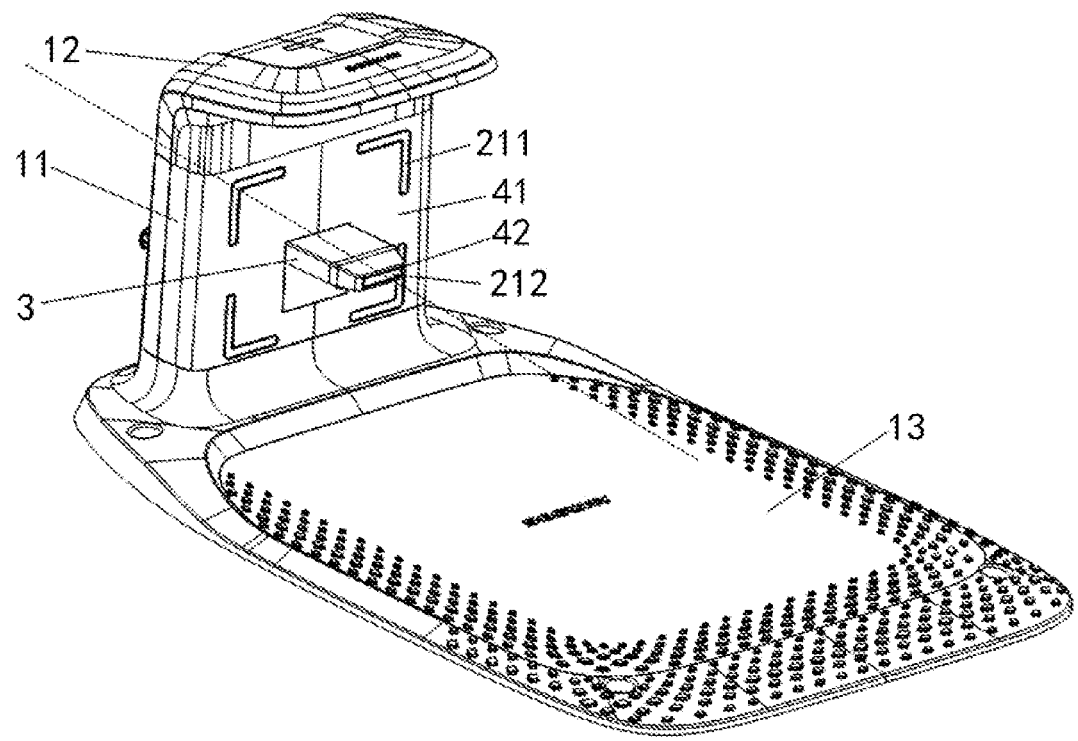
FIG. 3A is a schematic diagram of a distribution of marking components on a charging station according to an exemplary embodiment of the present disclosure.
Figure 3B:
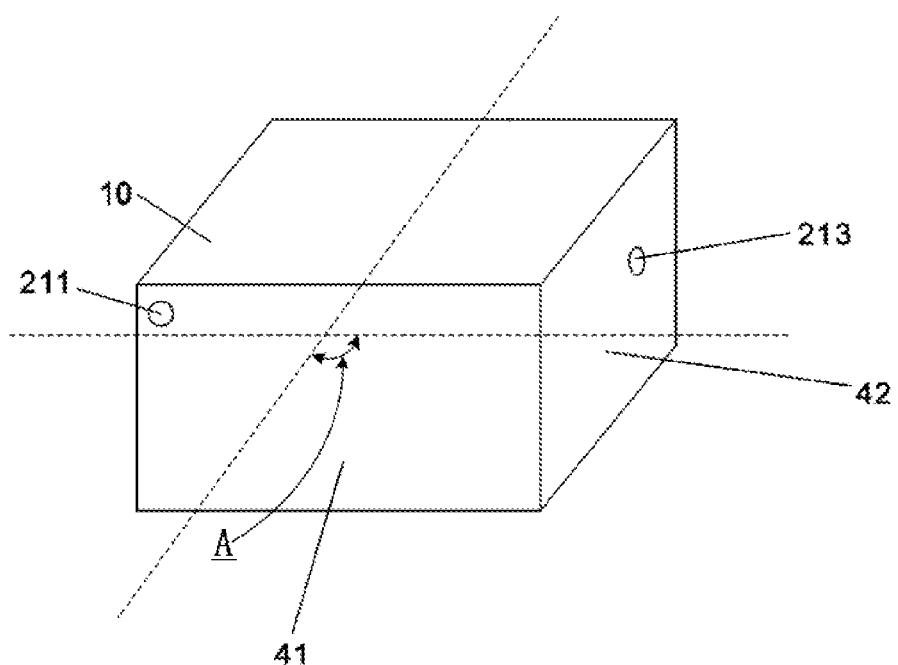
FIG. 3B is a schematic diagram of a distribution of marking components on a charging station according to an exemplary embodiment of the present disclosure.

In a specific implementation, the marking component 2 includes the first marking component 211 and the second marking component 212, and the first marking component 211 and the second marking component 212 have different distribution surfaces on the charging station 10. Exemplarily, the distribution surfaces of the marking component 2 on the charging station 10 may include sides and edges, and the sides and edges may be planes or curved surfaces. Referring to FIG. 3A and FIG. 3B, the first marking component 211 is located on a first distribution surface 41 of the charging station 10, the second marking component 212 is located on a second distribution surface 42 of the charging station 10, an angle A is formed between a normal of the first distribution surface 41 and a normal of the second distribution surface 42, and the angle is not equal to 0 degree; or the normal of the first distribution surface 41 is parallel to the normal of the second distribution surface 42, and the first distribution surface 41 and the second distribution surface 42 are spaced apart in a normal direction. It should be noted that when the marking component 2 is provided on a curved surface, the normal of the location of the marking component 2 is used as the normal of the distribution surface of the marking component 2.

In this specific implementation, by providing the first marking component 211 and the second marking component 212 on different distribution surfaces of the charging station 10, so that the distribution surfaces of the plurality of feature markers 20 are different, compared with the feature markers 20 distributed on the same surface, this implementation can improve the robustness of the image identification algorithm of the image collection apparatus, reduce a probability of misidentification, and improve the accuracy of the lawnmowing robot to perform image identification to calculate the relative pose information of the charging station 10.

The image collection apparatus collects images and identifies the first marking component 211 and the second marking component 212 in the images, and then extracts feature markers 20 in the first marking component 211 and the second marking component 212 (usually end points and inflection points of the first marking component 211 and the second marking component 212 are used as the feature markers 20).

A specific algorithm flow is as follows: provide n feature markers 20, first detect m (m<=n) position coordinates of the feature markers 20 on a 2D image, then match p (p<=m<=n) valid feature markers 20 based on the parameters of the image collection apparatus and 3D coordinate positions of the feature markers 20, and calculate a relative position of a vehicle body and a camera. When p=m=n, the image identification is considered successful. If the n feature markers 20 are all provided in the same plane, it is assumed that 4 first feature markers are provided and each first feature marker includes 1 feature marker 20 (marking point). 4 (n=4) feature markers 20 (marking points) form a rectangle, when problems such as sunlight, camera surface blocking, or blurring lead to detection on the 2D image, the two feature markers 20 on the left side of the rectangle are offset in the same direction (but the overall 4 feature markers after the offset of the 2 feature markers still satisfy geometric features of affine transformation), therefore, there is a chance that the algorithm can still output a pose that should be in error based on n=p=4 coordinates after the offset, and the pose may usually be severely offset. However, when there are feature markers 20 not in the same plane, it is assumed that 4 feature markers 20 are located at the end points of the rectangle on the same distribution surface, and two feature markers 20 included in the second marking component 212 are on the other distribution surface (distribution surface with 4 points protruding), i.e., n=6; when the feature markers on aside of the rectangle are offset and the four feature markers 20 in the same plane after the offset satisfy the geometric features of the rectangle after affine transformation, due to the presence of the protruding two feature markers 20, the algorithm cannot calculate a poses in error based on the coordinates after the offset (because in this regard, due to the presence of the protruding points p<n), a severely offset pose may not be provided. By providing the first marking component 211 and the second marking component 212 on different distribution surfaces of the charging station 10, it can improve the robustness of the image identification algorithm of the image collection apparatus, reduce the probability of misidentification, and improve the accuracy of the lawnmowing robot to perform image identification to calculate the relative pose information of the charging station 10.

In a specific implementation, the charging station 10 includes the charging station body 11 and the charging structure 3, the first marking component 211 and the charging structure 3 are provided on a first side of the charging station body 11, i.e., the first marking component 211 is provided on the side where the charging structure 3 is located.

A lens assembly of the image collection apparatus of the lawnmowing robot has a limited collection range. When the lawnmowing robot moves to the front area of the charging station 10 and starts docking in the station, the closer the lawnmowing robot is to the charging structure of the charging station, the larger the collection range of the lens assembly of the image collection apparatus occupied by the first side. By providing the first marking component 211 on the first side, the closer the lawnmowing robot is to the charging station 10, the more accurate it is to identify the position of the first marking component 211, the more accurate it is to determine the pose of the charging station 10, the more accurate it is to adjust the pose of the lawnmowing robot, and the more accurate it is to dock the charging structure 3 with the charging port of the lawnmowing robot.

Further, the charging structure 3 is set protruding relative to the first side. In a process of the charging port of the lawnmowing robot and the charging structure 3 just contacting to fully contacting, the first marking component 211 providing on the first side can ensure that the lawnmowing robot can still collect the first marking component 211, and continuously adjust the pose of the lawnmowing robot based on the position of the first marking component 211, ensuring that the charging port of the lawnmowing robot and the charging structure 3 fully contact and effectively charge.

In a specific implementation, the charging structure 3 is provided with the second marking component 212. The second marking component 212 may be provided on a front-end surface or a side of the charging structure 3.

In this implementation, by providing the second marking component 212 on the charging structure 3 and the first marking component 211 on the first side of the charging station body 11 where the charging structure 3 is mounted, structural features of the charging station 10 itself are used, so that the first marking component 211 and the second marking component 212 are located on different distribution surfaces. There is no need to set up a separate protruding plane or curved surface, the structure is simple, and costs can be saved.

In a specific implementation, the charging structure is provided with the second marking component 212 at an overhanging end, and the second marking component 212 is provided on a front-end surface. The image collecting apparatus is facing the front-end surface of the overhanging end of the charging structure 3, when the lawnmowing robot moves to a direction of the first side of the charging station 10 before reaching a station-docking position, front-end surface features of the overhanging end of the charging structure 3 can be fully collected. Compared with providing the marking component 2 on the side of the charging structure 3, the second marking component 212 provided on the front-end surface of the overhanging end of the charging structure 3 ensure that the lawnmowing robot can acquire all the feature markers of the second marking component 212, which improves the accuracy of pose information of the charging structure 3, and realizes station-returning and charging.

In a specific implementation, the marking component 2 further includes a third marking component 213, a second side of the charging station body 11 is provided with the third marking component 213, and the second side is connected to the first side. Exemplarily, the first marking component 211 and the third marking component 213 may be respectively distributed on the first side of the charging station 10 and any side adjacent to the first side, or the first side and any edge (an edge is an intersection of two adjacent sides in a peripheral surface). It should be noted that the edge here may refer to an edge surface, and the edge surface may be a plane or a curved surface.

It should be noted that in this implementation, the surface where the first marking component 211 is located is the aforementioned first distribution surface 41, and the surface where the third marking component 213 is located is the aforementioned second distribution surface 42, and an angle between the normal of the first distribution surface 41 of the first marking component 211 and a normal of the second distribution surface 42 of the third marking component 213 is formed, and the angle is not equal to 0 degree.

In this specific implementation, it may be ensured that the lawnmowing robot collects and identifies a greater number of feature markers 20 in all directions of the charging station 10, which in turn produces more robust image identification algorithm effects. For example, the third marking component 213 is provided on any side adjacent to the first side, so that the lawnmowing robot can identify the feature markers 20 even when an offset angle between the lawnmowing robot and the first side is large, to further adjust the pose of the lawnmowing robot to realize station-returning and charging.

In a specific implementation, the first marking component 211 is a plurality in number, and the plurality of first marking components 211 are distributed around the charging structure 3. The lawnmowing robot may return to the vicinity of the charging station from a different location and then dock in the station to charge. If the first marking components 211 are only provided in one orientation of the charging structure 3, it may lead to the inability to correctly identify the first marking components 211 due to blocking of the charging structure 3, resulting in pose errors.

For example, if only 2 first marking components 211 are provided on the first side and both are below the charging structure 3 (compared to the charging structure 3, the first marking components 211 are closer to the base plate 13), in the process of the charging port of the lawnmowing robot and the charging structure 3 just contacting to fully contacting, the lens assembly of the image collection apparatus is above the charging structure 3 (compared to the charging structure 3, the lens assembly of the image collection apparatus is further away from the base plate 13) and is blocked by the charging structure 3, cannot correctly identify the first marking components 211 below the charging structure 3. By distributing the plurality of first marking components 211 around the charging structure 3, in the process of the charging port of the lawnmowing robot and the charging structure 3 just contacting to fully contacting, it can be ensured that the lawnmowing robot can still collect the first marking components 211 located above the charging structure 3, thus reducing the inability to correctly identify the first marking components 211 due to blocking of the charging structure 3, resulting in pose errors.

In another embodiment, the plurality of first marking components 211 may be distributed at intervals around the charging structure 3. Referring to FIG. 4, the first marking components 211 are four, distributed at intervals around the charging structure 3. The feature markers 20 identified by the lens assembly of the image collection apparatus are mainly distributed at the end points, midpoints or inflection points of the marking components 2. By spacing the plurality of first marking components 211 at intervals, the number of feature markers at the end points may be increased.

In a specific implementation, the plurality of first marking components 211 is in a non-centrosymmetric distribution. When the image collection apparatus is biased at the location of the lawnmowing robot, the use of the plurality of first marking components 211 in a non-centrally symmetric distribution allows the distribution of the first marking components 211 to correspond to a biasing direction of the image collection apparatus, thus enabling the image collection apparatus to obtain more information of the marking components 2.

In a specific implementation, the first marking components 211 include two strip structures perpendicular to each other and intersecting. Exemplarily, referring to FIG. 4, the first marking components 211 may be L-shaped. By setting the shape of the first marking components 211 as two strip structures perpendicular to each other and intersecting, a plurality of scattered feature markers may be distributed with less consumables; secondly, compared to a plurality of dot-like marking structures, the structure in this implementation is integral, simple, and easy to install.

According to another aspect of the present disclosure, a charging station 10 system is provided, including the charging station 10 according to any one of the above embodiments and a marking apparatus 50, the marking apparatus 50 is provided with a fourth marking component 214, and the fourth marking component 214 is used to assist in determining a position of the charging station 10.

Alternatively, a third distribution surface 43 on the charging station 10 is provided with the marking component 2, the third distribution surface 43 may include the first distribution surface 41 and the second distribution surface 42, and a fourth distribution surface 44 on the marking apparatus 50 is provided with the fourth marking component 214, an angle is formed between a normal of the third distribution surface 43 and a normal of the fourth distribution surface 44, and the angle is not equal to 0 degree; or, the normal of the third distribution surface 43 is parallel to the normal of the fourth distribution surface 44, and the third distribution surface 43 and the fourth distribution surface 44 are spaced apart in a normal direction.

Figure 7:
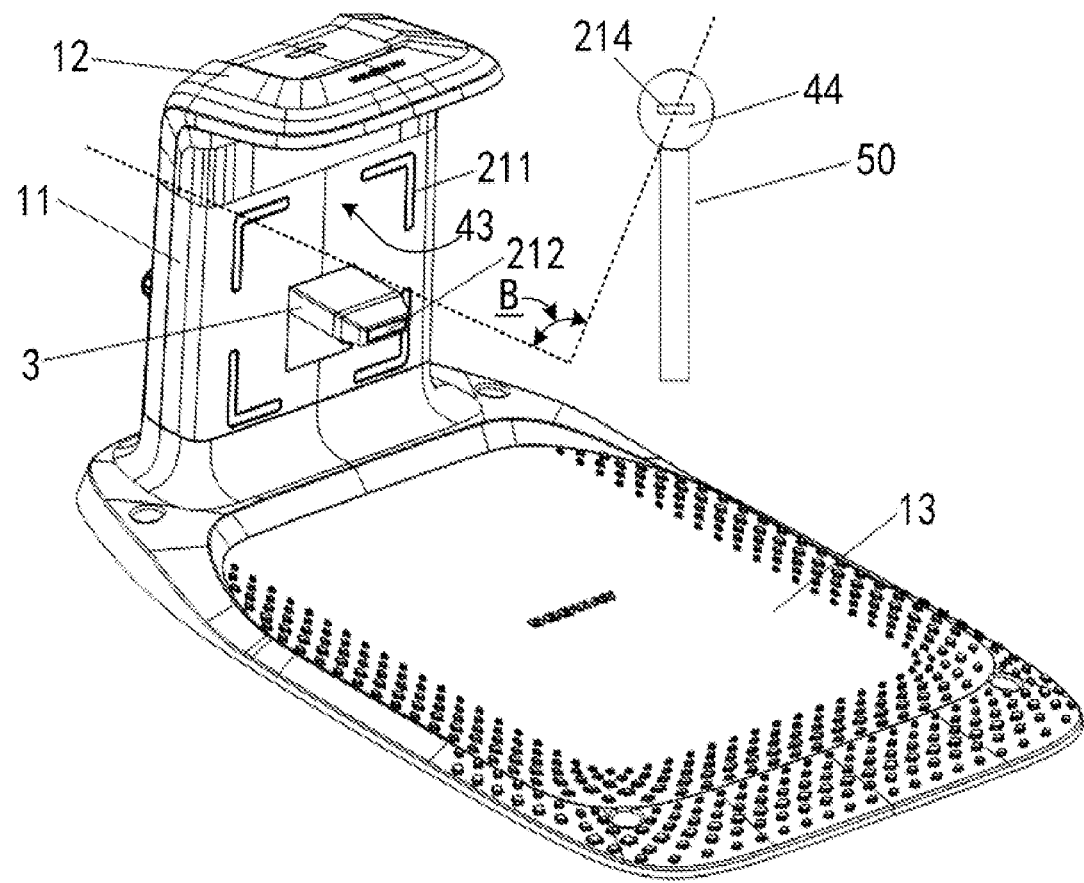
FIG. 7 is a schematic diagram of a charging station system of according to an exemplary embodiment of the present disclosure.

Exemplarily, referring to FIG. 7, the marking apparatus 50 may be a specific set marking sign, etc. The marking apparatus 50 and the charging station 10 are separately provided in the work area of the lawnmowing robot, the charging station 10 is provided with the marking component 2, such as a first marking component 211, a second marking component 212 and a third marking component 213, a surface on which the marking component 2 is located is the third distribution surface 43, the third distribution surface 43 may include the first distribution surface 41 and the second distribution surface 42 in the above embodiment. The marking apparatus 50 is provided with the fourth marking component 214, a surface on which the fourth marking component 214 is located is the fourth distribution surface 44, an angle B is formed between the normal of the third distribution surface 43 (dashed lines shown in the figure) and the normal of the fourth distribution surface 44 (dashed line shown in the figure), and the angle B is not equal to 0 degree; or, the normal of the third distribution surface 43 is parallel to the normal of the fourth distribution surface 44, and the third distribution surface 43 and the fourth distribution surface 44 are spaced apart in the normal direction.

In this embodiment, by providing the marking components 2 on the charging station 10 and the marking apparatus 50 respectively, the distribution surfaces of the plurality of feature markers 20 are different, thus improving the accuracy of the lawnmowing robot to perform image identification to calculate the relative pose information of the charging station 10.

In a specific implementation, the marking apparatus 50 is a positioning signal receiving apparatus. Exemplarily, the positioning signal receiving apparatus may be a GPS signal receiver. The fourth marking component 214 may be provided on a surface of the positioning signal receiving apparatus, and the connection may be removable connecting, etc. In this implementation, by providing the marking component 2 on the positioning signal receiving apparatus accompanying the charging station 10, the cost of separately providing the marking apparatus 50 may thus be reduced.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, features defined with "first" or "second" may explicitly or implicitly include at least one of the features.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the accompanying drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the scope of protection of the present disclosure.

Finally, it should be noted that: the above embodiments are merely used to illustrate the technical solutions of the present disclosure, instead of imposing any limitation on the present disclosure. Although the present disclosure has been described in detail with reference to the above embodiments, those with ordinary skills in the art should understand that: the technical solutions disclosed in the above embodiments may still be modified or a part of the technical features may be replaced equivalently. These modifications and replacements are not intended to make the essence of corresponding technical solutions depart from the spirit and scope of the technical solutions of the embodiments of the present disclosure.

What is claimed is:

1. A charging station, the charging station comprising a marking component, wherein the marking component includes a first marking component and a second marking component, the first marking component and the second marking component have different distribution surfaces on the charging station, and the marking component is used for indicating a position of the charging station so that a lawnmowing robot is capable of docking with the charging station for charging,
   wherein the charging station comprises a charging station body and a charging structure, both the first marking component and the charging structure are attached to a first surface of the charging station body with the charging structure protruding from the first surface of the charging station body and the second marking component is arranged on the charging structure, the first marking component includes a plurality of first marking component and each first marking component is a distinct structural element, and the plurality of first marking components are arranged to surround the charging structure.

2. The charging station according to claim 1, wherein the second marking component is arranged at an overhanging end of the charging structure, the overhanging end being an end of the charging structure that protrudes outward from the charging station body, and the second marking component is located on a front-end surface of the charging structure, the front-end surface being a surface of the overhanging end facing away from the charging station body.

3. The charging station according to claim 1, wherein the marking component further comprises a third marking component, the third marking component is arranged on a second surface of the charging station body, and the second surface is adjacent to the first surface of the charging station body such that the first surface and the second side share a common edge.

4. The charging station according to claim 1, wherein the first marking components comprise two strip structures perpendicular to each other and meeting at a point, and each strip structure is an elongated element.

5. The charging station according to claim 3, wherein:
   an angle is formed between a normal of the first surface and a normal of the second surface, and the angle is not equal to 0 degree.

6. The charging station according to claim 1, wherein a projection of the marking component projected onto a surface of the charging station body where the marking component is located forms a marking pattern, a minimum inner diameter of the marking pattern is greater than or equal to a first preset threshold, and the first preset threshold is 3 cm.

7. The charging station according to claim 1, wherein the marking component is a reflective assembly or a luminous assembly.

8. The charging station according to claim 7, wherein the reflective assembly comprises a reflective member and a mounting plate, the reflective member comprises a light-transmitting portion and a reflective portion, the reflective portion includes a plurality of sub-portions, each of the sub-portions includes three squares that are perpendicular to each other and share one common vertex, the reflective portion of the reflective member is fixedly connected to the mounting plate, and the reflective assembly is connected to a surface of the charging station body.

9. A charging station system, comprising: the charging station according to claim 1 and a marking apparatus, the marking apparatus being provided with a fourth marking component, and the fourth marking component being used to assist in determining a position of the charging station.

10. The charging station system according to claim 9, wherein the marking apparatus is a positioning signal receiving apparatus.

11. A method for returning to the charging station according to claim 1, the method being used for directing a lawnmowing robot to return to the charging station, the lawnmowing robot being configured with an image collection apparatus, and the method comprising:
   acquiring available image frames collected by the image collection apparatus of the lawnmowing robot in a front area of the charging station, a number of feature markers distributed on the marking component identified in the image frames being greater than or equal to N, and the N being a positive integer greater than or equal to 3;
   determining a relative pose of the lawnmowing robot relative to the charging station, based on two-dimensional coordinates of the identified feature markers distributed on the marking component in the image frames, three-dimensional coordinates of the feature markers in a global coordinate system, and imaging parameters of the image collection apparatus; and driving the lawnmowing robot to return to the charging station based on the relative pose.

12. The method according to claim 11, wherein the front area of the charging station comprises a sector area corresponding to the charging station, the sector area is located in front of the charging station, and a radius of the sector area takes a value greater than 0 and less than M, and the M is a positive integer.

13. The method according to claim 11, wherein the acquiring available image frames collected by the image collection apparatus of the lawnmowing robot in the front area of the charging station, comprises:

acquiring a navigation pose of the lawnmowing robot at a current moment;

determining whether the lawnmowing robot is in the front area of the charging station, based on the navigation pose and a preset pose of the charging station;

determining whether the available image frames are present in a sequence of image frames collected by the image collection apparatus when the lawnmowing robot is in the front area of the charging station;

using the present available image frames as the acquired available image frames when there are available image frames;

adjusting at least one of a position and a pose of the lawnmowing robot, and acquiring a new sequence of image frames, when the available image frames are not present, and returning to the step of determining whether the available image frames are present in the a sequence of image frames collected by the image collection apparatus to continue execution; and driving the lawnmowing robot to move into the front area of the charging station based on the navigation pose, if the lawnmowing robot is not in the front area of the charging station, and returning to the step of acquiring a navigation pose of the lawnmowing robot at a current moment to continue execution.

14. The method according to claim 13, wherein the adjusting at least one of a position and a pose of the lawnmowing robot, comprises:

adjusting the lawnmowing robot to a new navigation pose, the lawnmowing robot being located outside the front area of the charging station when in the new navigation pose; and driving the lawnmowing robot into the front area of the charging station based on the new navigation pose, the image collection apparatus collecting a plurality of image frames during movement of the lawnmowing robot to form the a sequence of image frames.

15. The method according to claim 11, wherein the charging station is provided with Q feature markers, the Q is greater than or equal to 2 and is a positive integer, for each coordinate axis of the global coordinate system, a maximum distance of a projection of the Q feature markers on each of the coordinate axis is greater than or equal to a distance threshold.

16. The method according to claim 15, wherein a distribution surface of at least two of the feature markers in the Q feature markers is different from a distribution surface of the remaining feature markers.

17. A lawnmowing robot, the lawnmowing robot comprising an image collection apparatus and a controller, and the controller being configured to perform the method according to claim 11.

* * * * *